United States Patent [19]

Kakita et al.

[11] Patent Number: 5,066,970
[45] Date of Patent: Nov. 19, 1991

[54] SWINGING TYPE CAMERA

[75] Inventors: Tsuyoshi Kakita; Masazi Yoshimura, both of Hachioji, Japan

[73] Assignee: Konica Corporation, Tokyo, Japan

[21] Appl. No.: 596,396

[22] Filed: Oct. 12, 1990

[30] Foreign Application Priority Data

Oct. 16, 1989 [JP] Japan .................. 1-268323

[51] Int. Cl.$^5$ .............................. G03B 13/00
[52] U.S. Cl. ........................ 354/402; 354/81; 354/266
[58] Field of Search ............... 354/400–409, 354/81, 266

[56] References Cited

U.S. PATENT DOCUMENTS 4,290,685 9/1981 Ban ........................ 354/266

Primary Examiner—Brian W. Brown
Assistant Examiner—David M. Gray
Attorney, Agent, or Firm—Finnegan, Henderson, Farabow, Garrett and Dunner

[57] ABSTRACT

A swinging camera includes a distance measuring section, an automatic release section, a rotating section, an angle detecting section, a determining section, a storage section, and a control section. The rotating section rotates the camera within one plane. The angle detecting section detects a rotational angle of the camera set by the rotating section and outputs rotational angle data. The determining section operates the distance measuring section in unit of a predetermined angle while the camera is rotated by at least one revolution by operating the rotating section prior to photography, and determines on the basis of output distance data and/or rotational angle data whether objects to be photographed are people. The storage section stores only rotational angle data of objects determined to be people, of rotational angle data output from the angle detecting section. The control section rotates the camera to each angular position based on the rotational angle data stored in the storage section when the automatic release section is operated, and stops the camera at each angular position.

4 Claims, 7 Drawing Sheets

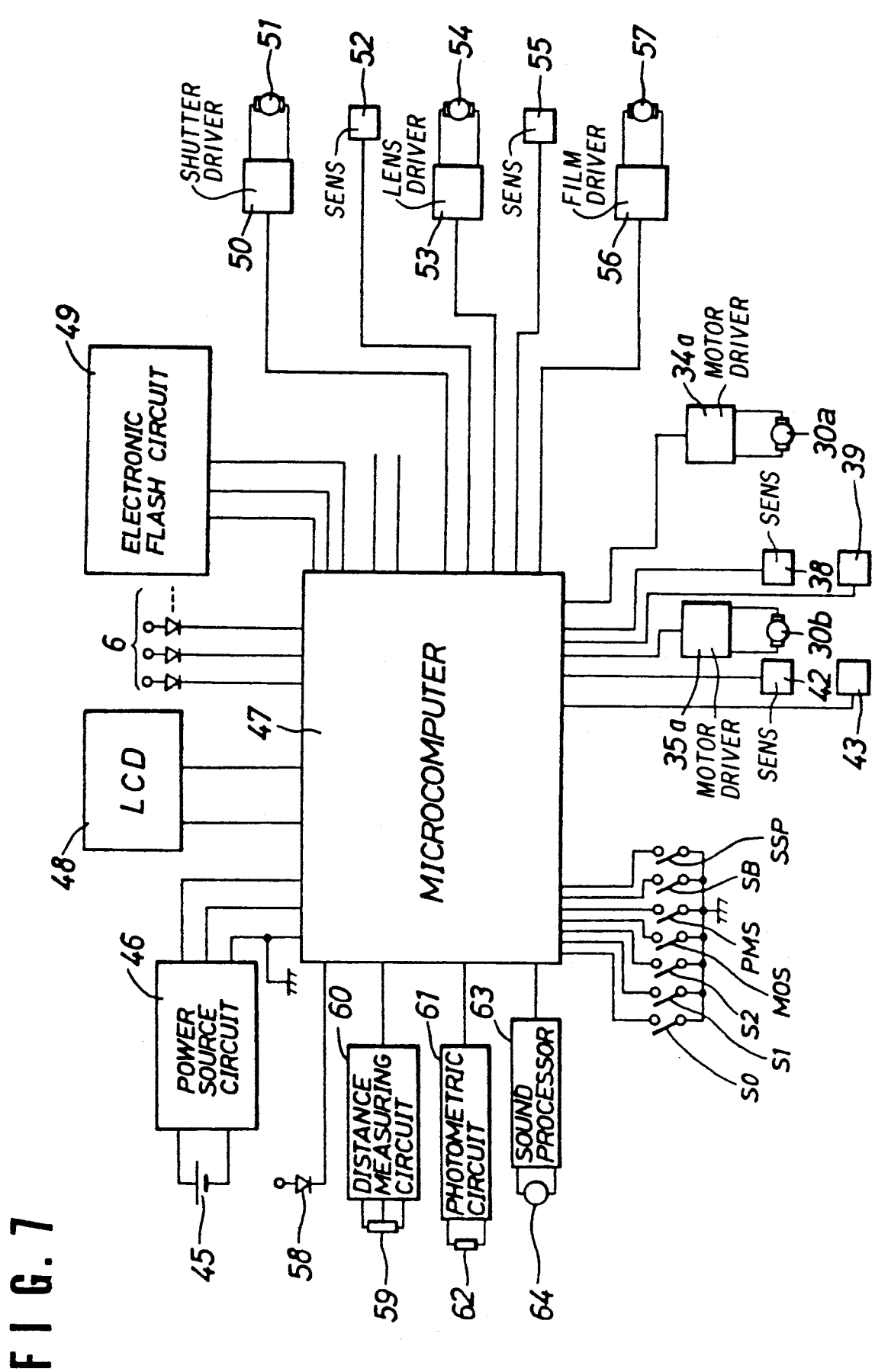
F I G. 7

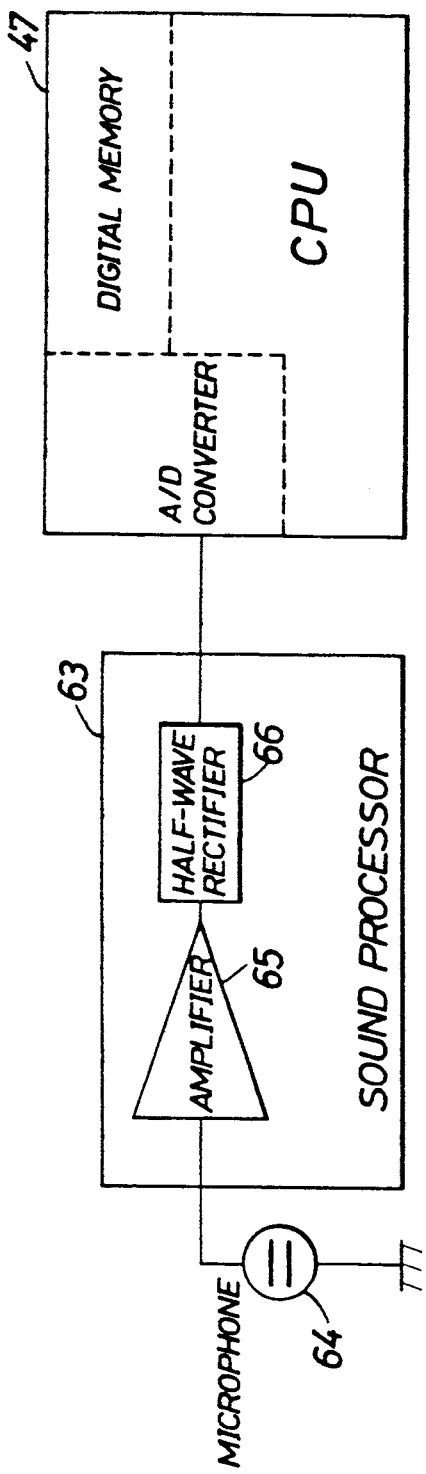
F I G. 8
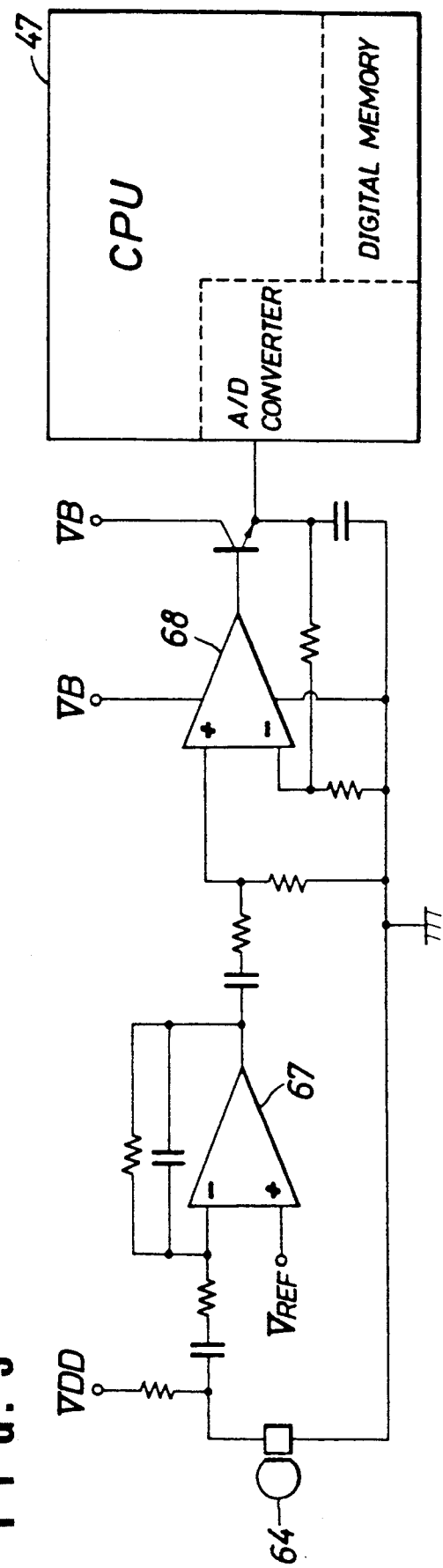
F I G. 9

SWINGING TYPE CAMERA

BACKGROUND OF THE INVENTION

1. Field of the Invention

The present invention relates to a swinging type camera designed to be released in response to input sounds.

2. Description of the Prior Art

Automation of the camera has progressed for the last several years and the present applicant has proposed an automatic release camera designed to automatically release the shutter in response to input sounds (refer to "Automatic Release Camera" in Japanese Patent Application No. 63-329184).

This camera is designed to detect the sound pressure level of every input sound to the camera, including a voice, laughter, a cheer, a clap, applause, and the like, and to perform a release operation when a detected sound pressure level keeps exceeding a reference sound pressure level for a predetermined period of time. It is, therefore, very convenient to use such a camera to take photographs at a banquet or party, because each release operation can be automatically performed at a jovial moment.

If such a camera is used, a user can be free from release operations. However, the user is still required to frame the picture to be taken. Otherwise, photography is continuously performed with the same frame set with the camera being placed on a tripod or a table. As a result, several photographs having the same composition are taken. During a banquet or a party, however, the user tends to forget to change the camera position, such an operation bothers the user.

Under these circumstances, the present applicant proposes a camera which can automatically change the framing by changing the camera position in synchronism with a photographic operation (Japanese Patent Application No. 1-51490).

The above-mentioned camera which automatically changes the framing (so-called swinging camera) is designed as follows. The camera is swung by a predetermined angle in one direction in synchronism with a wind-up operation of a film after a photographic operation. After reaching a certain angle, the camera is swung by a predetermined angle in the opposite direction. When the sound pressure levels of sound inputs exceed a predetermined level at the respective positions during this swinging operation, release operations are performed. By devising a swing mechanism for the camera, the camera can be swung by a predetermined angle in one direction. With this, people and scenes around the camera can be photographed.

In an automatic release camera of this type, however, a release operation is performed when the sound pressure level of an input sound satisfies release conditions even if the camera is swung to face a position where no objects are to be photographed, e.g. no people are present. As a result, photographs having no objects to be photographed may be taken.

SUMMARY OF THE INVENTION

The present invention has been made in consideration of the above situation and has as its object to prevent wasteful photographs having no human figure as an object to be photographed and to highly automate a photographic operation of a camera.

In order to achieve the above object, according to the present invention, a camera is designed as follows. Prior to photography, the camera is fixed to a predetermined position. While the camera is rotated, measurement of object distances is performed. Whether an object to be photographed is a person or not is determined on the basis of the angular position of the camera and distance measurement data at the angular position. If the object is a person, its position is stored. In an actual photographic mode, the camera is sequentially swung to the prestored position of each object. When sound pressure release conditions are satisfied at the position of each object, a release operation is performed and a picture is taken.

BRIEF DESCRIPTION OF DRAWINGS

FIG. 7 is a block diagram showing a circuit arrangement of the camera according to the present invention;

FIGS. 8 and 9 are block and circuit diagrams of a sound processor in FIG. 7;

DETAILED DESCRIPTION OF THE PREFERRED EMBODIMENT

The present invention will be described below with reference to the accompanying drawings.

Figure 1:
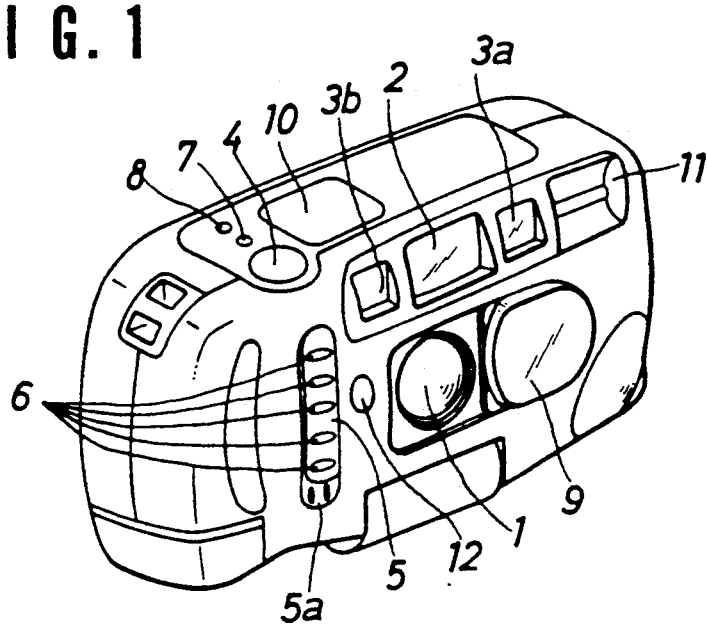
FIG. 1 is a perspective view showing an outer appearance of a camera according to the present invention.

FIG. 1 shows an outer appearance of a swinging camera according to an embodiment of the present invention.

Referring to FIG. 1, reference numeral 1 denotes a photographic lens; 2, a viewfinder; 3a and 3b, windows for emitting and receiving distance-measuring infrared rays; 4, a release button; and 5, an automatic release lever for setting an automatic release mode. In the automatic release mode, a release operation is automatically performed when the sound pressure level of every input sound to the camera, including a voice, laughter, a clap, and the like, continues for a predetermined period of time or more.

When the automatic lever 5 is slid upward, microphone holes 5a appear. A sound pressure detecting microphone phone is set under the microphone holes 5a. Five LEDs 6 for displaying the sound pressure level of a sound input through the microphone are arranged under the automatic release lever 5. That is, the automatic release lever 5 serves not only as an operation member but also as an indicator member. A user can easily perform ON/OFF control of the automatic release mode by operating the lever 5 on which a pressure level is indicated. In addition, even in the automatic release mode, a release operation can be performed by depressing the release button 4. Reference numeral 7 denotes a mode switching button for selecting whether to use a self-timer and selecting a flash mode and the like; 8, a level setting button for adjusting a reference sound pressure level at which a release operation is performed; 9, a lens barrier for protecting the photographic lens; 10, a liquid crystal display panel for displaying a frame count, a set value of reference sound pressure level, and other pieces of information associated with photographic operations; 11, an electronic flash; and 12, a photometric light-receiving lens. Note that the distance-measuring scheme of this camera is an active scheme.

Note that since a release operation of the camera is not directly associated with the present invention and is not required to understand it, a description thereof will be omitted. With regard to this operation, however, refer to Japanese Patent Application No. 1-51490 as needed.

A swing mechanism for vertically and laterally swinging the camera body will be described below with reference to FIGS. 2 to 5.

Figure 2A:
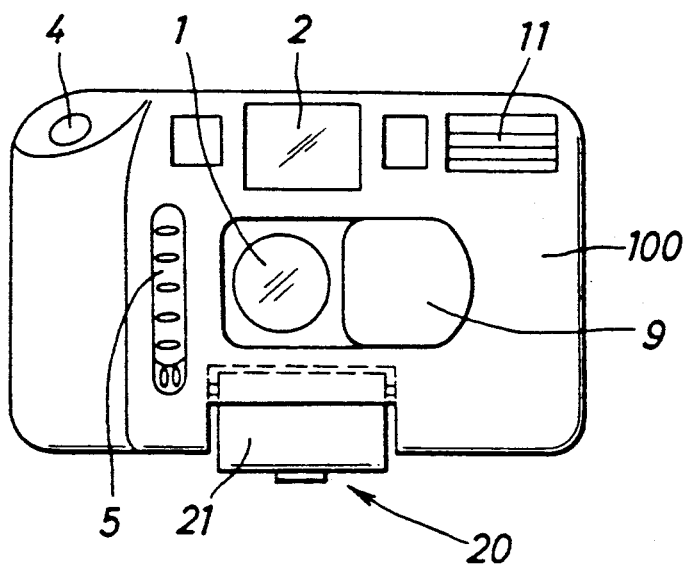
FIG. 2A and 2B are front and side views of the camera, showing the attaching position of a swing mechanism.
Figure 2B:
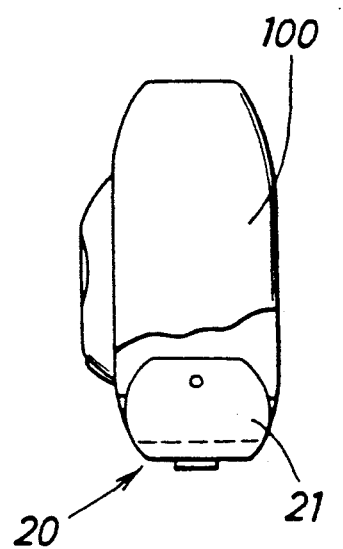

FIGS. 2A and 2B show the position of the swing mechanism attached to the camera. A swing mechanism 20 is pivotally attached to a central portion of the bottom surface of a camera body 100 stored in a case 21. If the bottom surface of the case 21 is fixed on a table by a proper method, the position of the camera can be fixed and a swinging operation can be performed (as will be described later) without using a special device such as a tripod. Therefore, a simple support means as described above can be used.

Figure 3:
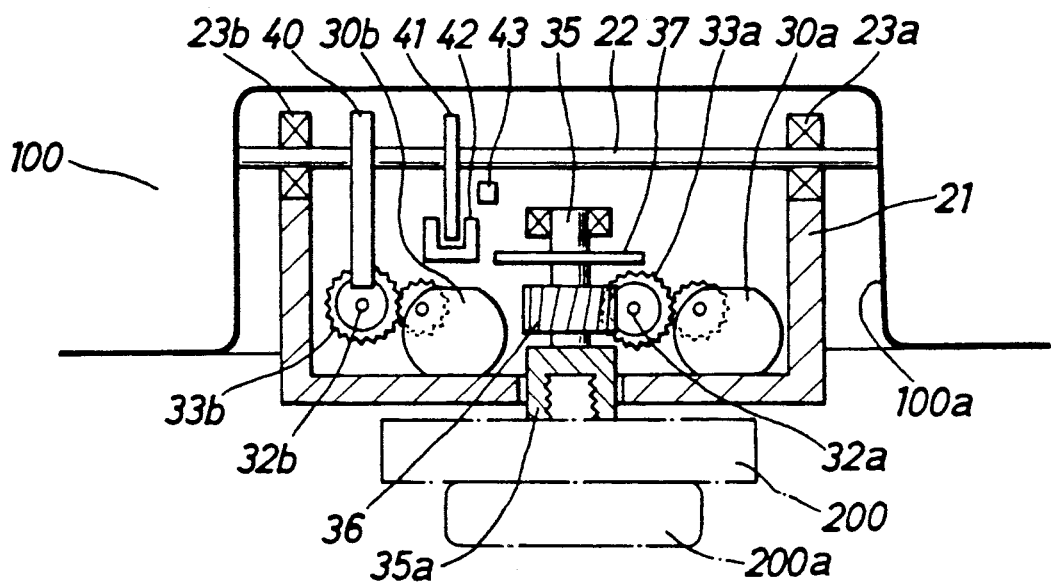
FIG. 3 is a cross-sectional view showing an internal structure of the swing mechanism.
Figure 4:
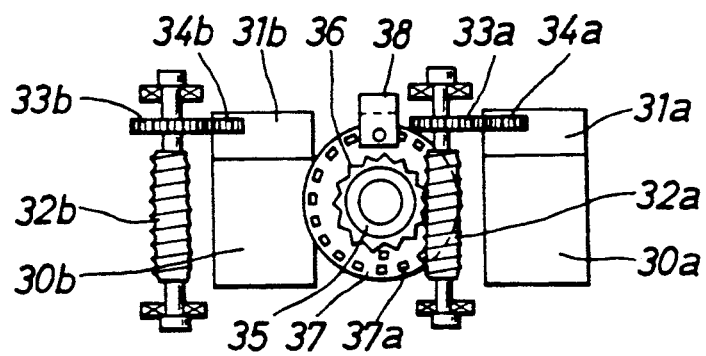
FIG. 4 is a plan view showing a main part of the swing mechanism.
Figure 5:
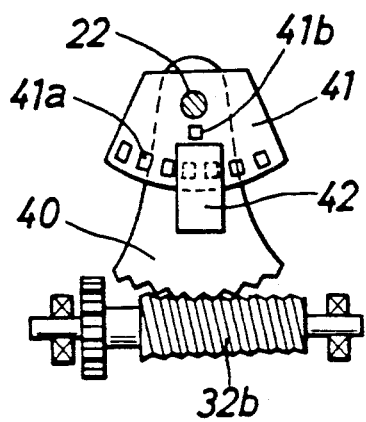
FIG. 5 is a view showing a main part of a vertical rotating mechanism of the swing mechanism.

FIGS. 3, 4, and 5 show a detailed structure of the swing mechanism 20.

As shown in FIG. 3, the swing mechanism 20 is housed in a recess 100a formed in a central portion of the bottom surface of the camera body 100. The case 21 is pivotally supported by a support shaft 22 through bearings 23a and 23b. The support shaft 22 horizontally extends at an upper portion of the recess 100a. The two ends of the support shaft 22 are firmly fixed to the camera body 100 so as not to rotate.

In the case 21, two motors 30a and 30b are horizontally arranged, and gear boxes 31a and 31b are coaxially arranged (see FIG. 4). The motors 30a and 30b respectively serve as drive sources for horizontally and vertically rotating the camera body 100.

A worm gear 32a is axially supported near the motor 30a so to be parallel to the axial direction of the motor 30a. The worm gear 32a is designed not to move in the axial direction of the case 21 but to be only rotated thereabout. A spur gear 33a is fixed to the shaft of the worm gear 32a. The spur gear 33a is coupled to the gear box 31a through a spur gear 34a in the gear box 31a. Similar to the worm gear 32a, a worm gear 32b is axially supported near the motor 30b so as to be parallel to the axial direction of the motor 30b. A spur gear 33b is fixed to the shaft of the worm gear 32b. The spur gear 33b is coupled to the gear box 31b through a spur gear 34b in the gear box 31b.

Figure 6:
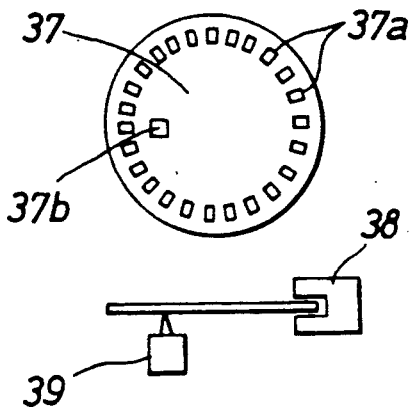
FIG. 6 is a view showing a mechanism for detecting the rotational angle of the camera.

The worm gear 32a is meshed with a worm wheel 36. A shaft 35 vertically extending in the center of the case 21 is coupled to the worm wheel 36 through a friction clutch (not shown). A rotation detecting disk 37 is fixed to an upper portion of the shaft 35. The disk 37 has holes 37a formed in its circumferential portion at equal angular intervals (e.g., 1°). In addition, a hole 37b (see FIG. 6) for detecting the front position of the camera is formed in the disk 37 at a position closer to the center than the holes 37a. A transmission type photointerrupter 38 (see FIG. 4) in the form of a U shape is arranged in the case 21 so as to sandwich a circumferential portion of the rotation detecting disk 37. In addition, a reflection type photointerrupter 39 (FIG. 6) is arranged at a position slightly inward from the circumferential portion, above which the hole 37b passes. An attaching boss 35a to be threadably engaged with an attaching screw 200a of a tripod 200 (indicated by an alternately long and short dashed line in FIG. 3) is formed in the lower end portion of shaft 35.

A sectorial worm plate 40 is meshed with the other worm gear 32b, as shown in FIG. 5. The worm plate 40 is coupled to the support shaft 33 through a friction clutch (not shown). A vertical angle detecting plate 41 is also fixed to the support shaft 33 to be very close to the worm plate 40. A plurality of holes 41a are formed along one side edge of the vertical angle detecting plate 41 at equal angular intervals. A horizontal position detecting hole 41b is formed in the plate 41 so as to be closer to the support shaft 22 than the holes 41a. A U-shaped transmission type photointerrupter 42 is arranged in the case 21 so as to sandwich the edge of the vertical angle detecting plate 41. In addition, a reflection type photointerrupter 43 is arranged near the vertical angle detecting plate 41 at a position to opposite the hole 41b.

A swinging operation of the camera will be described below.

When the horizontal rotation motor 30a is rotated, the gear in the gear box 31a is rotated to rotate the worm gear 32a through the spur gears 34a and 33a. Since the worm wheel 36 is meshed with the worm gear 32a, the shaft 35 is rotated through the friction clutch (not shown). The attaching boss 35a at the lower end of the shaft 35 is threadably engaged with the attaching screw 200a of the tripod 200. Since the resistance to the rotation of the fixed tripod 200 is larger than the resistance to the rotation of the camera body 100, the camera body 100 is rotated in a direction opposite to the rotating direction of the shaft 35 instead of the rotation of the tripod 200. When the horizontal rotation motor 30a is reversed, the rotating direction of the camera body 100 is reversed. With this operation, the camera body 100 is rotated clockwise and counterclockwise on the tripod 200.

When the vertical rotation motor 30b is rotated, the gear in the gear box 31b is rotated to rotate the worm gear 32b through the spur gears 34b and 33b. Since the worm plate 40 is meshed with the worm gear 32b, the worm plate 40 pivots about the support shaft 22, together with the support shaft 22, through the friction clutch (not shown). As a result, the camera body 100 fixed to the two ends of the support shaft 22 is rotated, e.g., upward. When the vertical rotation motor 30b is reversed, the camera body 100 is rotated, e.g., downward. With this operation, the camera body 100 is vertically swung on the tripod 200. In this case, the tripod is used. However, the tripod need not be used. The same effect as described above can be obtained by fixing the bottom surface of the case on a table by a proper method.

The preset initial angular position of the camera body 100 within a horizontal plane can be detected on the basis of an output from the photointerrupter 39 which is obtained when light which is reflected by the rotation detecting disk 39 and incident on the light-receiving portion of the reflection type photointerrupter 39 is no longer incident from the hole 37b of the rotation detecting disk 37. The swing angle of the camera body 100 within a horizontal plane can be detected on the basis of an output from the photointerrupter 38 which is obtained in accordance with the presence/absence of light transmitted through the holes 37a formed in the circumferential portion of the rotation detecting disk 37. In addition, the preset initial angular position of the camera body 100 within a vertical plane can be detected on the basis of an output from the photointerrupter 43 which is obtained when light which is reflected by the vertical angle detecting disk 41 and incident on the light-receiving portion of the reflection type photointerrupter 43 is no longer incident from the hole 41b of the disk 41. The swing angle of the camera body 100 in the vertical direction can be detected on the basis of an output from the photointerrupter 42 which is obtained in accordance with the presence/absence of light transmitted through the holes 41a formed in one side edge of the vertical angle detecting disk 41.

FIG. 7 is a block diagram showing a circuit arrangement of the camera in FIG. 1.

Referring to FIG. 7, reference numeral 45 denotes a battery; 46, a power source circuit for supplying power to the respective circuit components; 47, a microcomputer incorporating an A/D converter for controlling a photographic sequence; 48, an LCD for the liquid crystal display panel 10 and its driving circuit; 49, an electronic flash circuit for flashing the electronic flash 11; 50, a shutter motor driver for driving a shutter driving motor 51; and 52, a sensor for detecting a shutter blade position.

In addition, reference numeral 53 denotes a lens motor driver for controlling a photographic lens driving motor 54; 55, a lens position sensor for detecting the movement position of the photographic lens; and 56, a film motor driver for driving a film feed motor 57.

Furthermore, a driver 34a for controlling the horizontal rotation motor 30a and a driver 35a for controlling the vertical rotation motor 30b are arranged as components associated with the swing mechanism 20. The horizontal angular position of the camera body is detected by the photointerrupter 38 and 39. The vertical angular position of the camera body is detected by the photointerrupters 42 and 43.

Various types of switches will be described below. Reference symbol S0 denotes a main switch to be turned on when the lens barrier 9 is opened; S1, a switch to be turned on when the release button is depressed by one step; S2, a switch to be turned on when the release button is depressed two steps; MOS, a switch to be turned on when the mode switching button 7 is depressed; PMS, a switch to be turned on when the automatic release lever 5 is operated; SB, a switch to be turned on when the rear cover is opened; and SSP, a switch to be turned on/off in accordance with a feed operation of a film.

Reference numeral 58 denotes a distance measuring infrared LED for radiating infrared rays onto an object to be photographed; 59, a light-receiving element, such as a PSD, for receiving light reflected by the object; 60, a distance measuring circuit for detecting an object distance on the basis of the light reception position of the light-receiving element 59; 61, a photometric circuit for measuring the brightness of the object upon reception of an output from the light-receiving element 62; and 63, a sound processor for processing an output signal from a microphone 64.

As shown in FIG. 8, the sound processor 63 comprises an amplifier 65 for amplifying an output signal from the microphone 64, and a half-wave rectifier 66 for converting the amplified signal into a sound pressure signal representing the volume of sound. A sound pressure signal is output to the A/D converter in the CPU 47.

FIG. 9 is a circuit diagram showing the sound processor 63 in detail. A signal from the microphone 64 is amplified by a first operational amplifier 67 and is converted into a sound pressure signal by the half-wave rectifier including a second operational amplifier 68. Note that a logarithmic compression circuit (not shown) may be connected to the output terminal of the half-wave rectifier.

Figure 10:
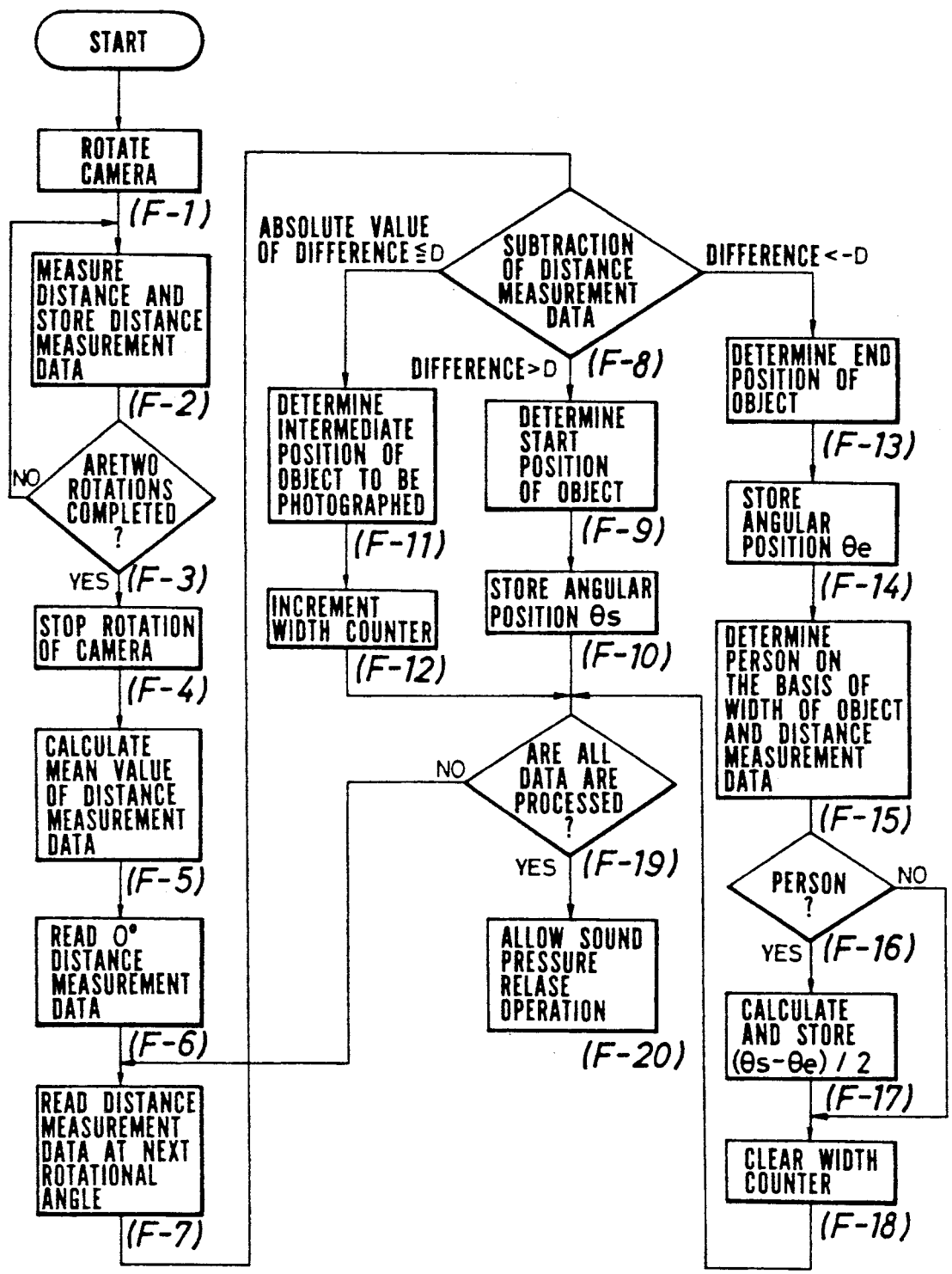
FIG. 10 is a flow chart for explaining an operation of a camera according to an embodiment of the present invention.

An operation of this embodiment will be described below with reference to FIGS. 10 and 11.

The height position of the camera is adjusted through the viewfinder so as to allow photography of people. The position of the camera is then fixed by a support means such as a tripod (the angular position at this time is set to be 0°). When the automatic release lever 5 is slid upward, the camera starts to horizontally rotate in units of, e.g., 1° (step F-1). Measurement of object distances is performed in units of 1°, and the distance measurement data and the angular position at each measurement is stored in the memory in the microcomputer 47 (step F-2). Measurement of object distances in units of 1° is performed until two revolutions of the camera are completed (step F-3). If two revolutions of the camera are completed, the camera is stopped (step F-4). A mean value of the first and second distance measurement data obtained at the respective angular positions is obtained and stored (step F-5). Note that distance measurement data in this case is decreased in value with an increase in object distance and vice versa and can be converted into an object distance.

Figure 11:
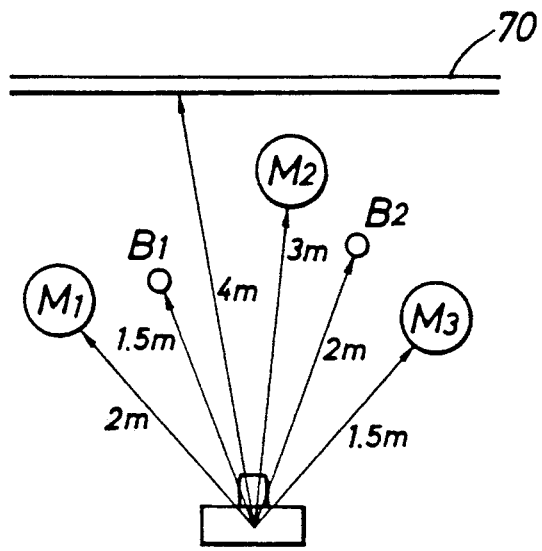
FIG. 11 is a view showing objects to be photographed.
Figure 12:
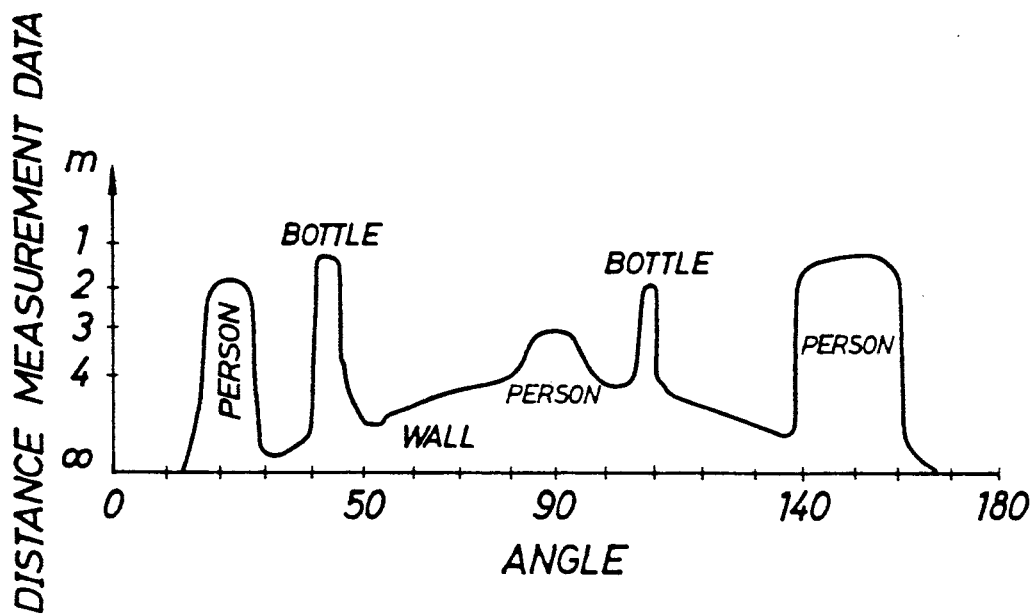
FIG. 12 is a graph showing distance measurement data.

Assume that objects to be photographed are distributed in such a manner that three people $M_1$, $M_2$, and $M_3$ and two bottles $B_1$ and $B_2$ are located in front of a wall 70 so as to be separated from the camera by distances shown in FIG. 11. FIG. 12 shows a mean value of distance measurement data obtained at the respective angular positions in step F-5.

Distance measurement data at a 0° angular position of the camera is read from the memory (step F-6). Subsequently, a mean value of distance measurement data at a 1° angular position is read (step F-7). The former value is subtracted from the latter value (step F-8). If the difference is larger than a predetermined positive value D, the start point of an object to be photographed is determined (step F-9). An angular position $\theta$s at this time is then stored, and a width counter (incorporated in the microcomputer 47) for detecting the width of an object is cleared (step F-10). If the absolute value of the difference is equal to or smaller than the value D, an intermediate portion of the object is determined (step F-11), and the width counter is incremented by one (step F-12).

When the difference becomes smaller than a predetermined negative value $-D$ while the above-described processing is performed, the end point of the object is determined (step F-13), and an angular position $\theta e$ at this time is stored (step F-14). Whether the object is a person or not is then determined on the basis of the width of the object, which is obtained from the count value of the width counter, and the distance measurement data (step F-15). This determination step is performed in the following manner.

Figure 13:
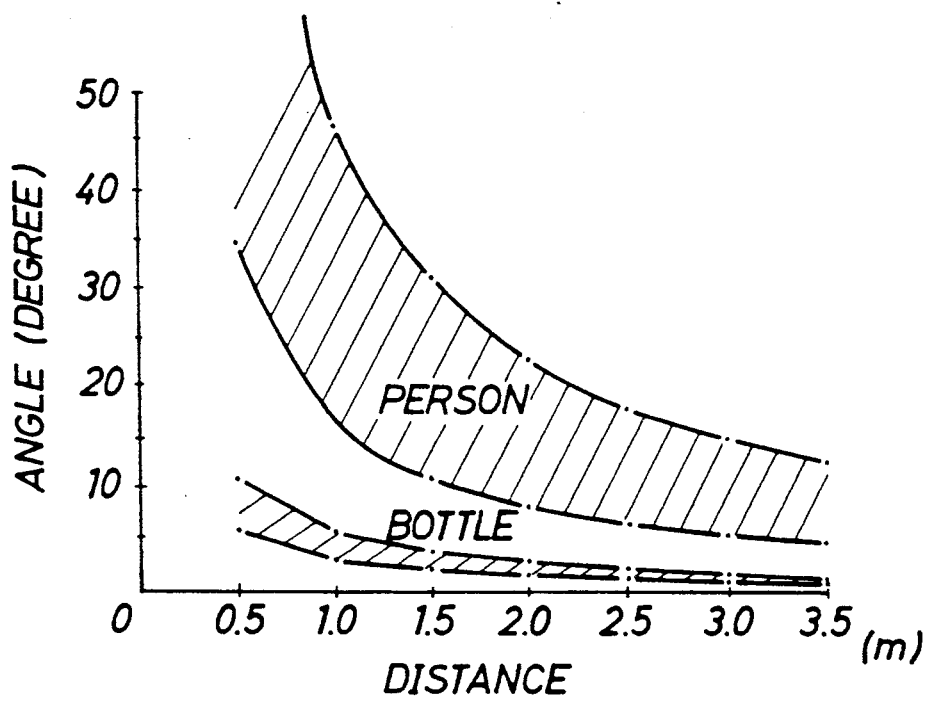
FIG. 13 is a graph for explaining an operation of determining a person as an object to be photographed on the basis of distance-angle characteristics and distance measurement data.

It is empirically found that distance-angle characteristics shown in FIG. 13 can be obtained, in which the distance to each object to be photographed is plotted along the axis of an abscissa, and the angle defined by the center of the camera and the two ends of each object, i.e., the width of each object is plotted along the axis of ordinate. Therefore, if a point defined by an angle corresponding to the width of an object, which is obtained from the count value of the width counter, and the distance to the object falls within a hatched region, it is determined that the object is a person.

If it is determined that the object is a person (step F-16), $(\theta e - \theta s)/2$ is calculated and stored, where $\theta s$ is the angular position of the camera corresponding to the previously obtained and stored start point of the object, and $\theta e$ is the angular position of the camera corresponding to the currently obtained end point of the object (step F-17). The obtained value is used as the central angular position of the object. Thereafter, the width counter is cleared (step F-18). If it is determined that the object is not a person, the flow advances to step F-18 without storing the angular position of the camera at which the object is present.

The processing from step F-7 to step F-18 is performed for all the mean values of distance measurement data (step F-19), and a sound pressure release operation is allowed upon completion of the processing (step F-20). The above description is associated with a pre-AF operation.

In this manner, the position of each person is stored in the camera. Subsequently, the camera is rotated to the angular position corresponding to the direction of the person $M_1$ upon rotation of the horizontal rotation motor 30a of the swing mechanism 20. At this position, the flow of processing waits until sound pressure release conditions are satisfied by input sounds for a predetermined period of time. If the sound pressure conditions are satisfied for the predetermined period of time, measurement of an object distance is performed. If the obtained distance measurement data is substantially equal to the distance measurement data with respect to the object $M_1$ which is measured in the pre-AF operation, a release operation is performed. If the difference between the former data and the latter data is large, it is determined that a bottle or the like is placed in front of the person $M_1$ after the pre-AF operation, or the person $M_1$ has moved. Subsequently, the camera is rotated to the angular position corresponding to the direction of the next person $M_2$, and the flow of processing waits until the sound pressure release conditions are satisfied by the next input sound. Note that if the sound pressure release conditions are not satisfied at the angular position corresponding to the person $M_1$ within a predetermined period of time, the camera is rotated to the angular position corresponding to the person $M_2$, and the flow of processing waits until the sound pressure release conditions are satisfied.

In the above embodiment, the flow of processing waits until the sound pressure release conditions are satisfied at an angular position corresponding to a given person for the predetermined period of time. If the conditions are not satisfied, the camera is horizontally rotated to an angular position corresponding to the next person. However, photography may be performed in such a manner that if the sound pressure release conditions are satisfied at an angular position corresponding to a given person, a release operation is performed unless the person moves or an obstacle is placed in front of the person, and that if the person moves or an obstacle is placed in front of the person, the camera is horizontally rotated to an angular position corresponding to the next person without performing a release operation. With this operation, in many cases, the camera is rotated to the position of the person $M_2$ after photography of the person $M_1$ is completed.

In the above embodiment, the number of people as objects to be photographed is three. It is, however, apparent that the number of people can be arbitrarily set.

In addition, any distance measuring method of detecting a person can be used as long as it can reliably detect a person. That is, the present invention is not limited to the method of obtaining a mean value upon two revolutions of the camera. Data acquisition by one rotation of the camera may be satisfactorily used depending on the performance and reliability of a distance measuring means.

The means for determining a person on the basis of an angular position and an object distance is not limited to the means based on the distance-angle characteristics shown in FIG. 13. For example, an object which slightly moves while the camera is rotated by two revolutions may be determined to be a person. That is, any means can be employed as long as it is designed to perform determination on the basis of the direction and distance data of a person.

In the above embodiment, the exemplified swing mechanism can perform horizontal and vertical swinging operations. In the present invention, however, a horizontal swinging operation is essential but a vertical swinging operation is not essential.

As has been described above, according to the present invention, prior to photography, measurement of object distances is performed while the camera is rotated. It is determined on the basis of the distance measurement data that an object to be photographed is a person. If a person is determined, its position is stored. In an actual photographic mode, the camera is sequentially swung to the prestored position of each person as an object to be photographed. If sound pressure release conditions are satisfied at the position of each object, a release operation is performed. With this arrangement, almost no manual operations are required, and photographic operations can be highly automated. In addition, people can be reliably photographed, and no wasteful photographs are taken.

What is claimed is:

1. A camera comprising:
   means for measuring distance from the camera to an object;
   means for automatically photographing a frame in response to detection of a sound;
   means for rotating the camera in at least one plane;
   means for detecting the rotational angle of the camera;

first means for determining, prior to photographing, distances and angular extents of each of several objects surrounding the camera;

second means for determining which of said objects have said distances and angular extents consistent with predetermined criteria and for storing the rotational angle of the so-determined objects; and means for successively rotating the camera to each stored angular position.

2. A camera according to claim 1, wherein the first determining means includes means for determining widths of said objects based in part upon said distances and wherein the second determining means determines that the distances and angular extents of said objects are consistent with said predetermined criteria when the widths of the objects satisfy predetermined data.

3. A camera according to claim 2, wherein the successive rotating means includes means for comparing the current distance of an object with the stored distance of the same object, and wherein the successive rotating means rotates the camera to the next angular position prior to operation of the photographing means if the current distance is substantially different from the stored distance.

4. A camera according to claim 1, wherein the rotating means is capable of rotating the camera in horizontal and vertical planes.

* * * * *